Oct. 27, 1959 R. P. WITT 2,910,616

SINE WAVE COLLECTOR MODULATION MEMORY

Filed July 23, 1954 3 Sheets-Sheet 1

INVENTOR

Richard P. Witt

BY Arthur Vinograd

ATTORNEY

Oct. 27, 1959 R. P. WITT 2,910,616
SINE WAVE COLLECTOR MODULATION MEMORY
Filed July 23, 1954 3 Sheets-Sheet 2
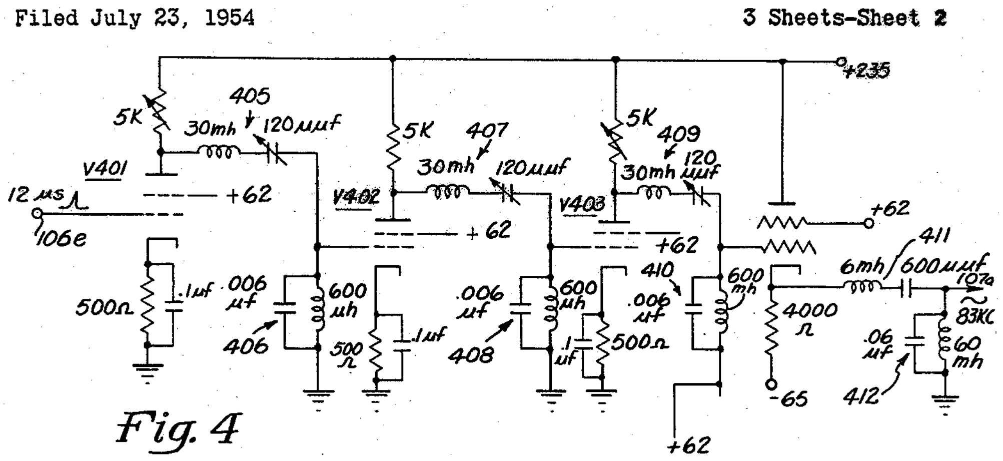
Fig. 4
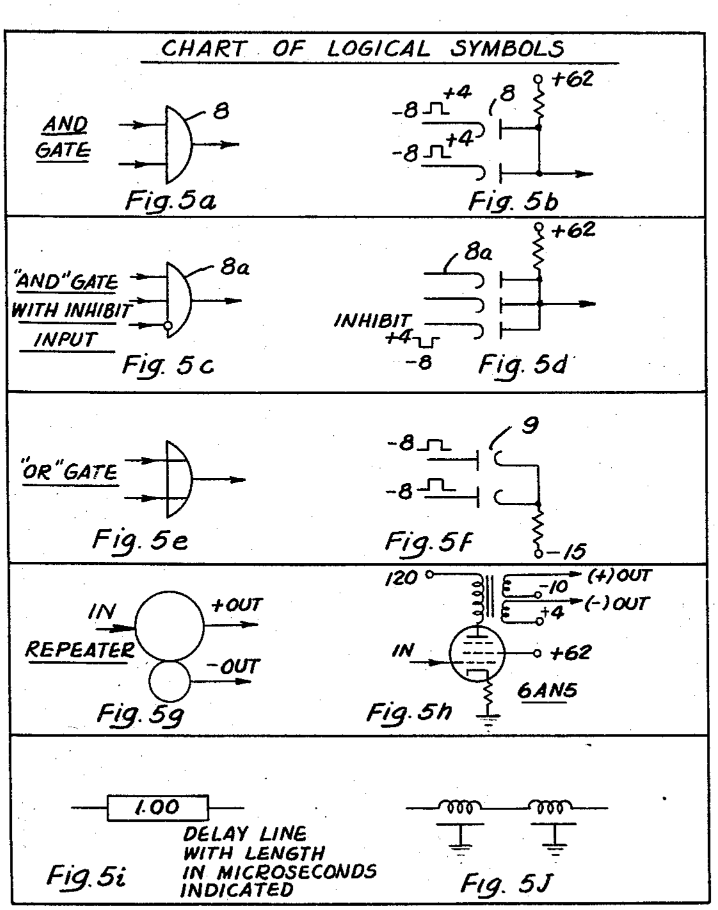
Fig. 5a, Fig. 5b, Fig. 5c, Fig. 5d, Fig. 5e, Fig. 5f, Fig. 5g, Fig. 5h, Fig. 5i, Fig. 5j
Fig. 5
INVENTOR
Richard P. Witt
BY Arthur Vinograd
ATTORNEY Oct. 27, 1959 R. P. WITT 2,910,616

SINE WAVE COLLECTOR MODULATION MEMORY

Filed July 23, 1954 3 Sheets-Sheet 3

INVENTOR

Richard P. Witt

BY Arthur Vinograd

ATTORNEY

United States Patent Office
2,910,616
Patented Oct. 27, 1959

2,910,616

SINE WAVE COLLECTOR MODULATION MEMORY

Richard P. Witt, Rockville, Md., assignor to the United States of America as represented by the Secretary of Commerce Application July 23, 1954, Serial No. 445,492

6 Claims. (Cl. 315—12)

This invention relates to an electrostatic memory or information storage device of the type in which "bits" of information, representing, for example, binary notations of digital information, may be stored.

The use of modified cathode ray tubes for such general purpose is known, as shown, for example, in the patent to F. C. Williams, Patent No. 2,642,550, issued on June 16, 1953. As is usual in systems of this type, an additional signal pick-up electrode is applied adjacent to the outside face of a conventional cathode-ray tube, the fluorescent screen of which is employed as a charge-storing area.

The pick-up electrode, being capacitively coupled to the storage screen will deliver output signals should a significant change in state occur during a reading operation such as occurs when the area on the surface of the storage screen bombarded by the electron beam differs from the area charged as a result of a previous storage operation.

One system generally employed to store information on a cathode-ray tube employs a coded representation in which two different discrete charged areas, such as, for example, either a dot-dash or a dot-circle pair may correspond to the "1"–"0" significance of a word bit in the binary systems. The dot is produced by allowing the electron beam to impinge upon the phosphor inner coating of the tube while either the "dash" or "circle" is obtained by employing the deflecting elements of the tube to produce a short sweep or "wiggle" of the beam relative to the "dot" position. An explanation of the theory underlying such storage systems is explained in an article by J. P. Eckert Jr. et al., published in Proc. IRE, vol. 38, 1950, pp. 498–510, entitled "A Dynamically Regenerated Electrostatic Memory System." To produce the dash or circle in such dot-line storage systems requires that a sweep be applied to the electron beam during a write operation and while reading. In the referred-to Williams patent, it has been shown that two distinguishable states can be manifested in a storage tube without the necessity of displacing or sweeping the beam to generate different parts of distinctly charged areas. In the Williams patent means are provided for applying an oscillatory voltage to an electrode such as an external screen which is capacitively coupled to the storage screen surface and the secondary emission ratio is accordingly varied by the oscillatory voltage while the storage area on the screen is being bombarded. The operation of such device is based upon the principle that secondary emission is greater when the phosphor screen is negative with respect to the collector (the Aquadag coating) than it is when it is positive with respect thereto. Such variation in secondary emission is employed to manifest separate states of charge in the tube which may subsequently be read.

The present invention also obviates the need for displacing or wiggling the electron beam in order to obtain the equivalent of a dash-signal store, by utilizing the control effect of an oscillatory signal to regulate secondary emission and thereby charge the phosphor screen of a storage tube to either of two states of charge. According to the present invention, the control effects of an applied oscillatory signal is utilized in a manner which realizes the maximum effect of a potential difference between a collector electrode and the storage screen of the tube by employing a construction in which secondary emission is directly controlled by the oscillatory signal in a more efficacious manner than is achieved by existing devices. Such arrangement enables the storing of potentials of much greater magnitude than can be obtained by using secondary emission velocity effects alone as will appear. Moreover, the principle of operation of a storage tube in connection with the present system is such as to permit the continuous application of an easily filterable oscillatory signal and so dispenses with the need for gating such signal, as in the device of the Williams patent, in order to obtain distinct recorded states. The invention further permits the choice of an oscillatory signal frequency which can easily be separated from the output by a simple filter arrangement.

It is therefore an object of the present invention to provide an electrostatic information-storage device of the type referred to in which the storage of information is obtained by varying the number of electrons deposited in a selected area.

Another object of the present invention is to provide an information-storage device in which the storage of information is manifested in the form of like areas having opposite states of charge.

A further object of this invention pertains to the use of a storage tube for storing information in such a manner that secondary emission disturbances of the areas on the surface of the storage screen surrounding a particular storage is minimized.

A still further object of this invention is to provide an electrostatic information storage system in which a greater number of discrete store areas is obtained than in previous systems employing a storage tube.

Control of electron deposition is accomplished by regulating the period of time that the electron beam is allowed to bombard an area on the storage screen and by varying the secondary emission conditions during the time that the area is bombarded.

Since the inception of the "Williams" effect storage technique, which commonly employs a "dot-line" symbolization for information representation, it has become common practice to refer to the two different states of charge of whatever form on the face of the storage tube as a "dot" and a "dash" store, respectively. Such conventional nomenclature is adhered to in the present disclosure and in the drawings in which.

Figure 3:
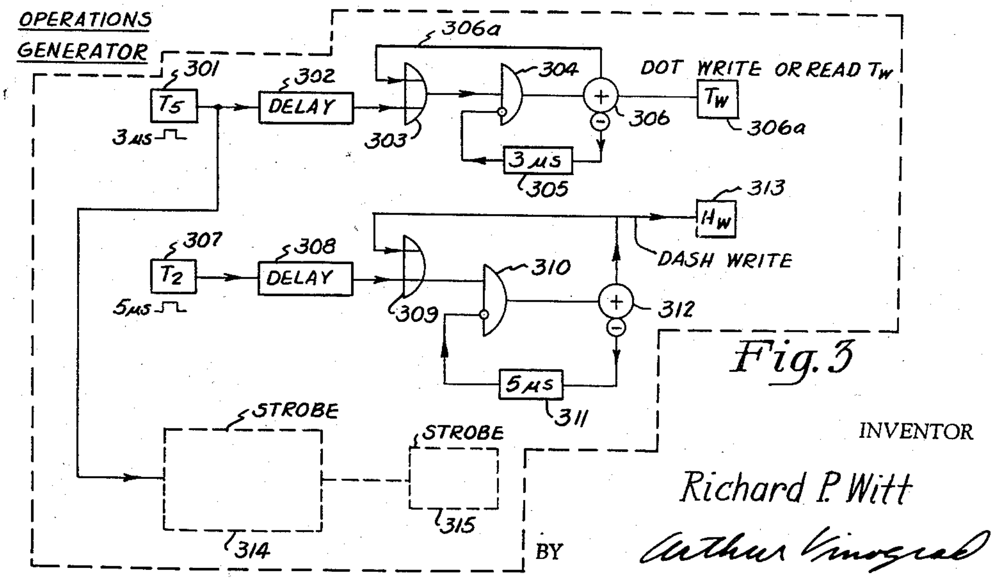
Figure 6:
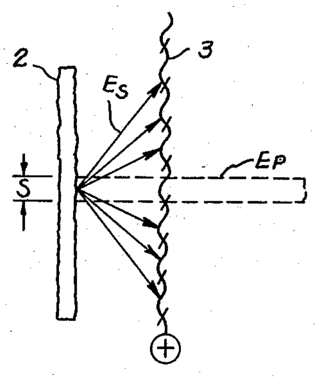
Figure 7:
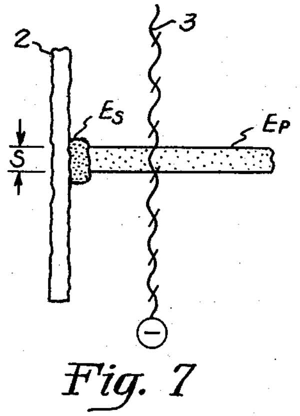
Figure 8:
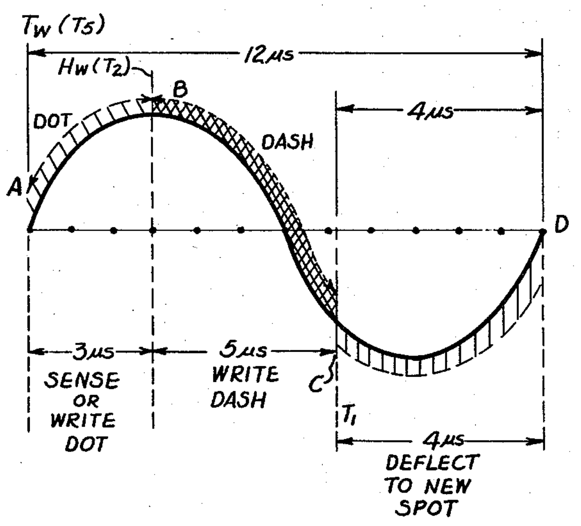
Figure 9:
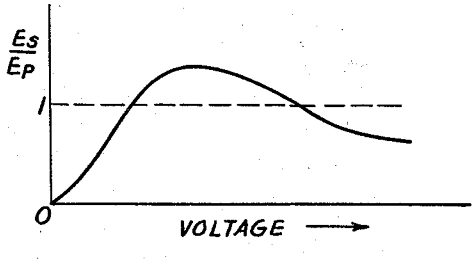

Fig. 3 details the structure of the operations generator;

Fig. 4 is a circuit diagram of the filter-amplifier employed for generating the oscillatory signal;

Fig. 5 is a chart identifying some of the conventional circuit elements employed;

Figs. 6 and 7 are enlarged views of a portion of the storage tube employed, illustrating secondary emission effects;

Fig. 8 is a cycle diagram showing the oscillatory signal employed in the present invention and further demonstrates the timing of the various operations involved, and Fig. 9 is a curve showing certain principles of secondary emission effects.

In describing the invention certain conventional definitions will be used. It is to be understood that the phrase "primary electrons" designated by the symbol E$p$ is intended to denote the electrons thrown against the screen of the tube by the impinging electron beam. The term "secondary electron emission" designated as $E_s$ is intended to describe those electrons emitted by the screen material when under bombardment.

The $E_s/E_p$ ratio or the ratio of the number of the secondary electrons emitted in response to the number of primary electrons supplied by the electron beam, is shown plotted against voltage in Fig. 9.

Equilibrium exists when the number of secondary electrons $E_s$ equals the number of primary electrons $E_p$ arriving on the beam; i.e., when $E_s=E_p$. Such equilibrium condition is indicated by the dotted line in Fig. 9, which shows the $E_s/E_p$ ratio plotted against voltage as an abscissa. As long as the $E_s/E_p$ ratio is greater than unity, more secondary electrons will be emitted from the screen than are supplied by the electron beam, and it is axiomatic that under such conditions of operation the screen area under the beam will be positively charged.

Figures 1, 2:
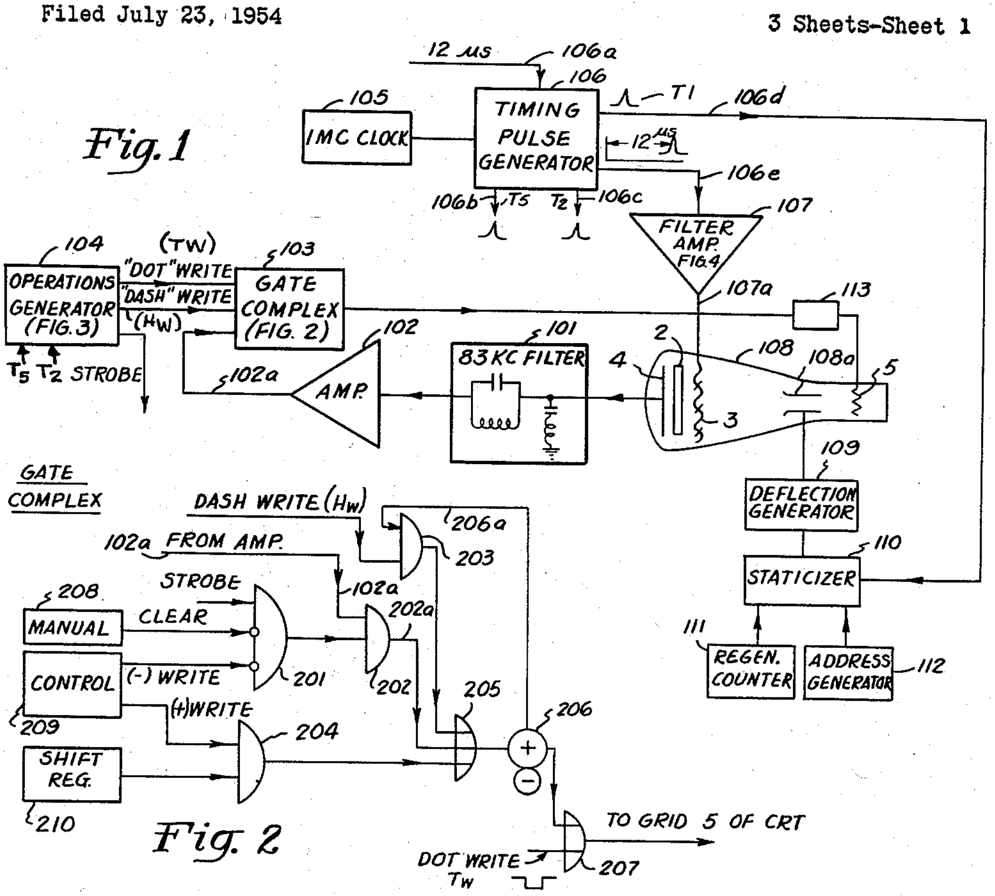
Fig. 1 is an over-all schematic representation showing the storage device and the associated circuitry in block diagram form.
Fig. 2 is a schematic of the gate complex employed.

The storage tube 108 employed in the construction of Fig. 1 is a known type of electron beam tube including a grid or control electrode 5, deflection elements 108*a* and an information storage phosphor screen 2. A collector 3 in the form of a grid or wire mesh through which the electron beam can pass, coextensive with the surface of the screen 2, is mounted in the glass envelope in proximity to screen 2. An additional pick-up electrode 4 may be provided either internally or externally to the tube but adjacent to screen 2.

Figs. 6 and 7 show an enlarged view of a portion of the phosphor screen 2 of a cathode-ray tube 108 together with the adjacent collector 3. As shown in Fig. 6 the greater portion of the secondary electrons $E_s$ are attracted to collector 3 when the latter is positively charged with respect to the screen 2. The consequent loss of electrons from the portion S of the screen surface corresponding approximately to the beam area leaves such portion of the storage screen at a positive potential.

The situation indicated in Fig. 6 would correspond to the inscribing of a "dot" on the storage surface according to the referred-to "Williams" patent.

Fig. 7 illustrates the effect of a negatively charged collector 3 on the electron beam $E_p$. Under such condition, the collector is negative with respect to storage screen 2, and the secondary emission electrons will, in such instances, be attracted back to the screen in the region of the beam area S. Such effect is roughly illustrated by the electron cloud designated as "$E_s$" in Fig. 7. The area S comprising the beam area is therefore in a state of negative charge because of the excess electrons in the area.

Such variations in the charge of the screen are manifested by detectable signals. That is, when there is a loss of electrons from a surface area S on the screen, a positive signal is generated, whereas when there is a gain of electrons on a surface area, a negative signal may be obtained. These signals can be detected by applying an electrode such as the pick-up plate 4 shown in Figure 1 adjacent to the storage surface screen 2 of the tube, the signals being transferred thereto by capacitive coupling. More properly, as is well known, when a "dash" signal is read or sensed by pick-up 4, a positive pulse is obtained from video amplifier 102, whereas a sensed "dot" condition will be manifested as either a zero or negative output pulse from amplifier 102.

The use of the "dot"-"line" or similar type of coding as described in the Eckert article makes it feasible to read the stored information, since, because of certain characteristic conditions created as a result of secondary emission phenomena, the effect of the electron beam, when made to sweep across such types of charged areas will be to discriminate between a read "dot" and a read "line" or between a "dot" and a "circle" according to another variant employed and described in the article. In other words, storing information corresponding to two different "bits" is accomplished by representing the information as two different and discernable bombarded areas of charge. Reading of such stored information is readily performed by stepping the beam to the desired incremented area on the screen surface, positioning it on the area corresponding to the first storage area and then deflecting or "wiggling" the beam through a fixed path, as described in the Eckert article, corresponding in size to the second storage area on the screen employed.

Since the reading of the stored information according to the described systems is based on the secondary emission effects of the storage tube, then the control of the secondary emission can obviously be applied to store and read information without the necessity of sweeping the beam in order to "paint" separate discernable areas on the storage screen.

According to the present invention, a secondary emission collector 3 in the form of a screen or mesh is provided adjacent to the inner phosphor face on the screen 2 of the storage tube as shown in Figs. 1, 6, and 7, in place of the "Aquadag" coating normally employed. The potential of such collector screen is caused to vary, preferably in a sinusoidal manner, by means of an oscillator directly connected to such collector electrode, and the instantaneous value of the potential on the electrode will be effective to control the secondary emission from the storage surface.

As shown in Fig. 1, an 83-kilocycle pure sine wave is obtained from filter amplifier 107 and is applied to collector 3 by means of conductor 107*a*. The potential of the collector is thereby caused to alternately vary between a positive and negative state during each cycle of the applied sine wave to produce the effects described in connection with Figs. 6 and 7.

The action of the oscillatory signal on collector 3 is more particularly shown in connection with Fig. 8. A single cycle of the applied sine wave is illustrated, and the time scale is approximately shown in microseconds along the base line of the curve.

The entire cycle occupies approximately 12 microseconds. The interval comprising the first 3 microseconds from the start (point A) of the cycle is employed to either sense or to write the equivalent of a dot store (according to the Williams convention). As shown in Fig. 8, such operation occurs in the interval between points A and B on the cycle diagram, the point A corresponding to the time of application of dot-write or read pulse $T_w$ to be described. The next 5 microseconds is employed to write a dash information signal, and such operation occurs in the designated portion occurring between points B and C on the curve, point B corresponding to the instant of application of dash-write pulse $H_w$, later to be described. The remaining 4-microsecond interval of the curve (between points C and D) is reserved for deflecting the beam to a desired orientation with respect to a selected area on the storage screen of the storage tube in order to select a desired store. The voltage-time relationship expressed in the diagram of Fig. 8 is manifested on the collector 3, and the secondary emission effects consequent thereto (as illustrated in Figs. 6 and 7) will vary accordingly. That is, during the dot portion of the cycle designated as A—B in Fig. 4, the conditions of Fig. 6 will prevail and a positive store area S will be defined; while the dash portion of the cycle B—C will be reflected as the conditions illustrated in Fig. 7, and a negative store area S will be defined.

In either case, namely whether a dot or dash is being written, the storage area under the beam will be charged to a definite state or condition depending upon the time interval during which the electron beam bombards the storage area. Consequently, during a subsequent reading operation significant signals will be manifested for both a dot and dash condition as the electron beam scans the charged areas. It is further apparent from Figs. 1, 6, and 7, that due to the proximity of the oscillatory signal receiving screen 3 to the storage screen 2, the area adjacent to the beam area is not readily affected by the secondary effects of the electron beam bombardment. Actual tests would appear to indicate that as many as 4000 discrete store areas can be obtained on the store surface on the information-storage screen of a tube with the present system as compared with 1000 elemental areas obtainable with known systems. The tests have further indicated that owing to the described principles of information storage employing the oscillatory signals on the collector 3, there is an almost complete absence of destruction of the adjacent store areas when the electron beam interrogates a selected area.

Because of the relatively low frequency (83 kc.) of the oscillatory signal employed, the entire write operation is completed within approximately a little more than one-half of the cycle period, as is obvious from Fig. 8. Moreover, such oscillatory signal is supplied to the collector electrode continuously, and no gating circuitry is therefore required to regulate the application of such signal to the collector. In other words, the oscillatory signal serves to automatically control the degree of secondary emission required to create the desired store areas.

It follows from the described construction that the potential of the areas S which is bombarded by the electron beam E*p* is substantially directly proportional to and follows the potential or state of charge on the collector 3. That is, the area S is charged positively during the portion of the cycle of the oscillator which renders collector 3 positive and vice versa. While it is true that a certain amount of capacitive coupling exists as a result of the proximity between surface 2 and collector 3, such coupling is not large enough to affect the potential gradient between these elements. The potential difference or gradient between collector 3 and storage surface on the information-storage screen 2 is therefore maintained at a maximum and is substantially proportional to the amplitude of the oscillatory signal shown in Fig. 8, as is the charge on the beam area S. Such arrangement enables the stored potentials to be much greater in magnitude than that which is obtainable by using secondary emission velocity effects alone as in the case of the referred-to Williams patent. In consequence also, the larger signals thereby obtained when the charged store areas are read have a much greater signal-to-noise ratio than has hitherto been obtainable.

The described principle of operation of the storage tube 108 depends upon the timing cycle demonstrated in Fig. 8, and the circuit construction symbolically illustrated in Fig. 1 provides the necessary synchronously timed application of signals to the collector 3 and grid 5 in order to obtain the desired results.

The over-all construction and operation of the circuit means associated with storage tube 108 will be described, the specific construction and functioning of the circuit components being detailed subsequently.

The circuit makes use of the pulses generated by a high-stability 1-megacycle clock-pulse generator 105 of known construction. Such generator is part of the over-all system with which the storage tube comprising the immediate invention may be employed. The specific circuitry of the clock generator 105, timing pulse generator 106, operations generator 104, deflection generator 109, staticizer 110, and address generator 112 (Fig. 1), is similar to that employed with the National Bureau of Standards Eastern Automatic Computer (SEAC) which is described in an article entitled "SEAC" by Greenwald et al., Proc. IRE, vol. 41, October 1953, pp. 1300–1313, and which is in public use. Since the detailed construction of such elements is available to the public, only those features pertinent to the operation of the storage tube will be referred to.

*Obtaining the oscillatory signal on collector 3*

In order to obtain the pure 83-kilocycle sine wave oscillatory signal for application to collector 3 in the desired manner, a pulse recurring at a 12-microsecond rate is selected from timing-pulse generator 106 and applied to filter amplifier 107. Timing-pulse generator 106 is a conventional scaler type generator, which is timed by an accurate source of synchronizing pulses **106*a*** of like frequency and thereby produces synchronized timing pulses comprising:

(1) a series of $T_5$ dot-timing pulses, each occurring slightly before the commencement of each 12-microsecond interval, (2) a series of $T_2$ dash-timing pulses, each occurring at an interval of slightly less than 3 microseconds after the beginning of a 12-microsecond period, and (3) a series of $T_1$ deflection-timing pulses occurring at an interval of slightly less than 8 microseconds from the beginning of a 12-microsecond period.

The significance of these timing pulses will become apparent by reference to the timing cycle of Fig. 8 as the description proceeds.

The pulse having a 12-microsecond repetition rate obtained at lead **106*e* is applied to filter amplifier 107 which is detailed in Fig. 4. Such amplifier employs a series of stages of amplifier tubes V401–V404 of the pentode type. Each stage is elaborately filtered by employing tuned filters 405–412**, suitably distributed among the various stages.

Sufficient specifications concerning the values and arrangement of the filter amplifier circuit are detailed in Fig. 4 to enable it to be constructed and operated. The pulses from 106 are applied at input terminal **106*e* and a pure sine wave having a frequency of 83 kilocycles and a 12-microsecond period is obtained at output lead 107*a* and is directly applied to collector 3** of the storage tube.

In accordance with the theory explained in connection with the cycle diagram of Fig. 8, a commutating system synchronously timed with the sine wave period is necessary in order to sense or write a dot pulse during the 3-microsecond interval A—B (Fig. 8) and to write a dash pulse during the sequentially following 5-microsecond interval indicated as B—C on the cycle diagram.

*Commutation system*

The operations generator 104 detailed in Fig. 3, gate complex 103, shown in Fig. 2, and video amplifier 102 of standard construction, together with 83-kilocycle filter 101 are employed to obtain the required commutative action. The gate complex 103 logically determines the character of energization of grid 5 and electron beam E*p*.

The general functioning of such elements is based upon whether a reading or writing operation is to take place. A reading operation requires that the signals sensed by pick-up electrode 4 (Fig. 1) be regenerated or re-stored in the tube 108. A writing operation requires the storage of new information in the tube. In a reading operation the signals obtained from pick-up 4 are filtered to remove the 83-kilocycle modulation in filter 101 (Fig. 1) and are amplified in video amplifier 102. As will appear in connection with the explanation of the detailed construction of gate complex 103, as shown in Fig. 2, if a reading or signal regeneration process is contemplated, gate complex 103 will (1) determine that the read signal is to be rewritten; (2) determine whether such signal is to be rewritten as a dot or dash, and (3) cause the energization of grid 5 accordingly. If a writing operation is contemplated, gate complex 103 will (1) act to cut off the signals obtained from reading amplifier 102, (2) select the means for writing a dot or a dash and (3) produce energization of grid 5 accordingly. In general the output from video amplifier 102 is fed to gate complex 103 to determine whether the electron beam is to be held energized during the interval defined by B—C in Fig. 8 in order to rewrite a dash. If it is not held on for such interval; i.e., if energized only for the interval A—B, a dot is rewritten. The manner of performing a read or write operation will be clear from a description of the gate complex 103 as is detailed in connection with Fig. 2. As previously set forth, the sensing of a dash store by pick-up electrode 4 produces a positive pulse output from video amplifier 102, whereas the reading of a dot store will produce a non-significant (0) or negative output from amplifier 102.

*Gate complex (Fig. 2)*

The diagram of Fig. 2 employs the logical symbolization using conventional components of the type illustrated and explained in connection with the chart shown in Fig. 5. Standard gates, repeaters, and delay lines of known types are employed. The gate circuits (Figs. *5a–5f*) and the repeater (Figs. *5g–5h*) are fully described in an article entitled "Dynamic circuit techniques used in SEAC and DYSEAC" by Elbourn and Witt, appearing in Proc. IRE, vol. 41, October 1953, pp. 1380–1387.

The gate complex comprises an "and-inhibitor" gate 201 (see Figs. *5c, 5d*) and a plurality of and-gates 202, 203, 204 (Figs. *5a, 5b*) or-gates 205, 207 (Figs. *5e, 5f*) and a repeater 206 (see Figs. *5g, 5h*).

The and-inhibitor gate 201 (Fig. 2) is connected to receive a clear signal from a manual control 208 and a "(—) write" or write-inhibiting signal from a control element 209. Such elements are conventional in a system such as represented by the identified "SEAC" as is the shift register 210. The gate 201 is further energized by a "strobe" signal generated in the operations generator 104 (see also Fig. 3). The characteristics of gate 201 are such that the application thereto of a strobe pulse, unless inhibited, will pass through to energize and-gate 202. During a "read" or regenerative operation, gate 202 will also have received a signal from amplifier 102, which signal may be a positive pulse in the event a dash has been read or non-significant in the event a dot has been read. Upon concurrence of a positive signal and the strobe signal, an output signal will be transmitted from gate 202 to or-gate 205 via conductor 202*a* and will be applied therethrough to the input of repeater 206. The construction of the repeater is detailed in Fig. *5h* of the chart (Fig. 5) and is further described in the referred-to article by Elbourn et al. Its operation is such as to produce two outputs of opposite polarity upon receiving an input signal as indicated in Fig. *5h*. Thus the read signal obtained from amplifier 102 will be applied from the positive terminal of repeater 206 to or-gate 207, and thence to phase-inverting driver 113 to energize grid 5 of the storage tube 108. As previously explained, the reading action is such as to manifest a positive output from amplifier 102 only in the event that a dash store has been read. In other words a dash-write signal (H*w*) will be obtained from gate 205 for application to storage tube 108 during a reading or regenerative operation, since gate 202 will produce an output signal only upon concurrent receipt of a strobe pulse from gate 201 and a signal corresponding to a read "dash" signal from amplifier 102. Such dash-write signal is in the form of a pulse, which is of sufficient duration to keep the electron beam energized for a period corresponding to the interval B—C shown in the cycle diagram of Fig. 8. Thus a dash store is rewritten in accordance with the principles already described in connection with Figs. 6–8. As previously noted, if the beam is not held energized for such period; namely, if it is held energized only for the period corresponding to A—B in Fig. 8, as will subsequently appear, a dot store will be rewritten. In other words, it may generally be stated that a dot is always written during any reading or writing operation and the dash-write signal overrides the dot signal when a dash store is to be written.

*Gate complex—"write" function*

Referring again to Fig. 2, in order to write a dot, the electron beam is energized by applying a T*w* (dot-write) pulse through or-gate 207. A dash is written by energizing the grid 5 with both a T*w* pulse and an output signal from repeater 206. Such action is obtained in the following manner.

When an inhibit ("(—) write") signal is supplied by control 209 to the inhibit electrode of gate 201, no output will be obtained therefrom because of the characteristics of such gate. Since logical and-gate 202 requires two concurrent signals in order to operate, the effect of such inhibit or "(—) write" pulse is to block off any read information being supplied by amplifier 102 to or-gate 205. Thus the described regenerative reading operation is cut off and rewriting into the storage tube cannot thereafter occur.

If, now, a "(+) write" pulse from control 209, together with a concurrent pulse from shift register 210 is applied to and-gate 204, an output signal will be obtained therefrom which will pass through or-gate 205, thereby turning on repeater 206. The positive output from the repeater is fed back through line 206*a* and comprises one input to gate 203. Gate 203 is also supplied with an H*w* (dash-write) pulse as is evident from Fig. 1, and such feedback action operates to keep the repeater 206 on for the duration of a dash-write pulse, the negative output from the repeater being applied to the grid of the storage tube through phase inverter 113 (Fig. 1). Since the electron beam is thereby held energized for a 5-microsecond period corresponding to the duration of an H*w* pulse, a dash will be written into the storage tube.

From the above description, it is apparent that if no pulse is obtained from shift register 210, gate 204 will be cut off and repeater 206 will not be energized in the described manner. Hence, only the T*w* (dot-write) pulse applied through or-gate 207 will be effective to energize the electron beam for a 3-microsecond period corresponding to the dot-write interval A—B (Fig. 8).

Summarizing, repeater 206 is held on by either gate 204 or gate 202, depending on whether a reading or writing operation is contemplated, and is maintained on for the duration of a 5-microsecond H*w* pulse through the feedback path including gate 203. If neither of the gates 204 or 202 are effective, only a dot pulse is applied to the storage tube. The gate complex 103 functions as a signal commutating means controlled by the operations generator 104 and functions to energize the electron beam of the storage tube 108 during intervals occurring within each cycle period of operation defined by the operating generator.

*Operations generator 104 (Fig. 3)*

It has been pointed out in connection with the description of the gate complex that a dot-write pulse (T*w*), a dash-write pulse (H*w*) and a strobe pulse are required to secure the requisite commutative action necessary to obtain storage of information in the storage tube. As already described, there is available at the output of timing-pulse generator 106 three synchronizing pulses which occur approximately at 0, 3, and 8-microsecond intervals measured, respectively, from the beginning of each 12-microsecond interval as represented by the cycle diagram of Fig. 8.

The operations generator comprises a logical circuit which is keyed by each of such pulses and generates, respectively, a dot-write pulse (T*w*) of 3-microsecond duration, followed by a dash-write pulse (H*w*) of 5-microsecond duration, and finally a strobe pulse which occurs during the 3-microsecond interval, in the following manner:

(1) *Generating the Tw (dot-write) pulse.*—The referred-to $T_5$ synchronizing pulse, which is generated by timing-pulse generator 106 approximately at the commencement of each 12-microsecond cycle, is applied at 301 in Fig. 3 and is further synchronized for correct timing by delay line 302. That is, to insure that the $T_5$ synchronizing pulse will initiate the T*w* pulse precisely at the beginning of each 12-microsecond cycle, the $T_5$ pulse is delayed in delay line 302 to achieve the necessary timing. Such pulse then passes through or-gate 303, and-inhibit gate 304, and turns on repeater 306. The operation of a typical repeater has already been explained. Repeater 306 would be maintained "on" by virtue of the feedback lead 306*a* which furnishes a positive feedback signal through or-gate 303 and gate 304. However, the negative output signal available from repeater 306 is delayed for a 3-microsecond interval by delay line 305, and is applied as an inhibiting signal to gate 304, thereby stopping regeneration of the signal. It follows therefore that such portion of the operations generator initiates a T*w* output signal at the beginning of a 12-microsecond cycle period, is maintained "on" for a 3-microsecond period, and is then abruptly halted, thereby producing the desired T*w* dot-write signal of 3-microsecond duration, which is utilized in accordance with the theory discussed in connection with writing a dot-store signal (Fig. 8).

(2) *Generating the 5-microsecond Hw (dash-write) pulse.*—The $T_2$ synchronizing pulse, which is generated by timing-pulse generator 106 slightly before each 3-microsecond interval, measured from the beginning of each 12-microsecond cycle, is applied at 307 in Fig. 3 and is delayed by delay line 308, so as to insure initiation of the H*w* pulse at a 3-microsecond interval measured from the beginning of each 12-microsecond cycle. The operation of or-gate 309, and-inhibit gate 310, 5-microsecond delay line 311, and repeater 312, acts to initiate the H*w* pulse at such time and maintain it for precisely a 5-microsecond interval in a manner identical to that described in connection with the generation of the T*w* pulse.

(3) *Generating the strobe pulse.*—The circuit for generating the strobe pulse is identical with the 3-microsecond T*w* pulse-forming circuit and is initiated by the same $T_5$ synchronizing pulse. Such circuit is therefore only illustrated symbolically in broken lines as elements 314, 315 in Figure 3.

Operations generator 104 thereby produces the three required T*w*, H*w*, and strobe pulses governing the operation of the gate complex already described.

As is conventional in information storage systems of the type disclosed herein, access means are provided to select a particular "store." Such means generally comprise an electron beam stepping means co-operable with the deflection plates 108*a* in the storage tube to position the beam at a selected coordinate point or area in the tube face. The present invention is not concerned with the beam deflection system, since any known type of positioning device may be used. For the purposes of completing the disclosure, however, a deflection generator 109 has been shown, the operation of which is initiated by timing pulse $T_1$ obtained from output 106*d* of the timing pulse generator. As is evident from the timing diagram of Fig. 8, the 4-microsecond period of the oscillatory cycle is reserved for positioning the beam. The synchronizing pulse $T_1$ is fed to staticizer 110, which in turn is loaded by address register 112, when the computer either calls for or wishes to write information into the memory. The latter instrumentality symbolizes access-determining means. During other periods, the register counter 111 contents are loaded into the staticizer to permit regeneration in a sequential manner of the information already stored.

While a preferred embodiment of the invention has been shown and described, it is apparent that various modifications within the scope of the invention disclosed would be apparent to those skilled in the art. The means for generating the oscillatory signal, for example, and the particular type and components comprising the commutating means employed, are subject to considerable design variation without materially altering the novel manner of storing information in the tube. It is not intended therefore to limit the scope of the invention to the particular means disclosed except as determined by the appended claims.

What is claimed is:

1. In an electronic storage device including an emissive information-storage screen having a storage surface and means for directing an electron beam to a selected incremented area on said surface and a control electrode, the combination of a collector electrode mounted in congruent registry with said storage surface, a timing device, means controlled by said timing device and directly connected to said collector for continuously applying an oscillatory signal of cyclically varying polarity and having a fixed cycle period whereby a continuously varying and recurring potential gradient is created between the collector and said information-storage screen surface, and signal commutating means controlled by said timing device and connected to said control electrode for energizing the electron beam during intervals occurring within said fixed cycle period and synchronously with each of said oscillatory signals.

2. The structure according to claim 1 in which said collector electrode comprises a screen mounted within the storage tube, parallel with said information storage screen surface, through which at least part of the electron beam may pass.

3. The structure according to claim 1 in which said signal commutative means includes gating means for selectively energizing the electron beam for different predetermined periods corresponding to a "dot-write" or "dash-write" operation, respectively, said periods occurring within said fixed cycle period of the oscillatory signal.

4. In an electronic storage device including an emissive information-storage screen having a storage surface and means for directing an electron beam to a selected incremental area on such surface, means for controlling the secondary electron emission from said surface comprising: a collector electrode mounted in congruent registry with said information-storage screen surface, means for establishing a continuously varying potential gradient of cyclically alternating polarity between said collector electrode and storage screen surface comprising a timed source of oscillatory signals including means directly connecting said signal source to the collector electrode, and means responsive to said source for controlling the electron deposition on said area by said electron beam synchronously with said oscillatory signals comprising signal gating means for selectively determining different periods of energizations of the electron beam corresponding to a "dot-write" or "dash-write" operation, respectively, said operational signals occurring within the time interval defined by such oscillatory signal.

5. In an electronic storage device of the type including an electron beam tube having an electron emissive information storage screen having a storage surface, a control electrode and means for directing an electron beam to a selected incremental area on said surface, the combination of a collector electrode and a signal pick-up electrode registering with said storage screen surface, a timing device, means controlled by said timing device and directly connected to said collector for continuously applying an oscillatory signal of cyclically varying polarity and having a fixed cycle period whereby a continuously varying and recurring potential gradient is created between the collector and said information-storage screen surface, a signal commutating device, said control element connected to said timing device and pick-up electrode, respectively, for energizing the electron beam during intervals occurring within said fixed cycle period and synchronously with each of said oscillatory signals, said commutating means further including signal gating means, and control means connected to said gating means for selectively regenerating the signals sensed by said pick-up means.

6. A structure in accordance with claim 5 in which said commutating means comprises an operations generator for generating separate signals corresponding to distinct operational orders, and said gating means further including gating elements responsive to said separate operational signals, respectively.

References Cited in the file of this patent

UNITED STATES PATENTS

| | | |
|---|---|---|
| 2,454,410 | Snyder | Nov. 23, 1948 |
| 2,706,246 | Klemperer | Apr. 12, 1955 |